(12) United States Patent
Iwamura et al.

(10) Patent No.: US 10,132,721 B2
(45) Date of Patent: Nov. 20, 2018

(54) DEVICE FOR MEASURING TREAD RING RIGIDITY AND METHOD FOR MEASURING UNIFORMITY OF TREAD RING

(71) Applicant: Sumitomo Rubber Industries, Ltd., Kobe-shi (JP)

(72) Inventors: Wako Iwamura, Kobe (JP); Makoto Sugiya, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 142 days.

(21) Appl. No.: 15/030,664

(22) PCT Filed: Nov. 11, 2014

(86) PCT No.: PCT/JP2014/079862
§ 371 (c)(1),
(2) Date: Apr. 20, 2016

(87) PCT Pub. No.: WO2015/068850
PCT Pub. Date: May 14, 2015

(65) Prior Publication Data
US 2016/0266011 A1 Sep. 15, 2016

(30) Foreign Application Priority Data

Nov. 11, 2013 (JP) ................... 2013-233338
Dec. 27, 2013 (JP) ................... 2013-271789

(51) Int. Cl.
G01M 17/02 (2006.01)
B60C 19/00 (2006.01)
B60C 11/03 (2006.01)

(52) U.S. Cl.
CPC ............. *G01M 17/02* (2013.01); *B60C 19/00* (2013.01); *B60C 2011/0334* (2013.01)

(58) Field of Classification Search
None
See application file for complete search history.

(56) References Cited

U.S. PATENT DOCUMENTS 7,418,988 B2 * 9/2008 Cron ................... B60C 7/18
152/11
8,783,310 B2 * 7/2014 Abe ................... B60B 9/26
152/12

(Continued)

FOREIGN PATENT DOCUMENTS

JP 01156634 A * 6/1989
JP H01-156634 A 6/1989

(Continued)

OTHER PUBLICATIONS

International Search Report dated Feb. 17, 2015 in PCT/JP14/079862 Filed Nov. 11, 2014.

(Continued)

*Primary Examiner* — Peter Macchiarolo
*Assistant Examiner* — Jermaine Jenkins
(74) *Attorney, Agent, or Firm* — Oblon, McClelland, Maier & Neustadt, L.L.P.

(57) ABSTRACT

A rigidity measurement device of a tread ring comprises a support jig for detachably holding a tread ring unit. The support jig has an open part for deformably exposing a measurement area, which is one portion of the tread ring, to the exterior, and a restraining part for essentially non-deformably restraining a non-measurement area, which is an area other than the measurement area of the tread ring. The restraining part inhibits deformation of the non-measurement area, whereby stress is no longer generated in the non-measurement area and the rigidity of the measurement area alone can be measured.

21 Claims, 13 Drawing Sheets

(56) References Cited

U.S. PATENT DOCUMENTS

| | | | |
|---|---|---|---|
| 9,248,697 B2* | 2/2016 | Iwamura | B60B 1/06 |
| 9,581,525 B2* | 2/2017 | Morris | G01M 17/02 |
| 9,616,713 B2* | 4/2017 | Lettieri | B60C 7/20 |
| 2010/0011852 A1 | 1/2010 | Andonian et al. | |
| 2010/0200131 A1* | 8/2010 | Iwase | B29D 30/00 |
| | | | 152/209.1 |
| 2011/0056284 A1 | 3/2011 | Hanada et al. | |
| 2016/0288588 A1* | 10/2016 | Tanno | B29D 30/0061 |
| 2017/0157983 A1* | 6/2017 | Siegel | B60C 7/14 |

FOREIGN PATENT DOCUMENTS

| | | | |
|---|---|---|---|
| JP | 2614470 B2 | 5/1997 |
| JP | 2004-9768 A | 1/2004 |
| JP | 4530231 B2 | 8/2010 |

OTHER PUBLICATIONS

Extended European Search Report dated Jun. 1, 2017, in European Patent Application No. 14859878.2.

* cited by examiner

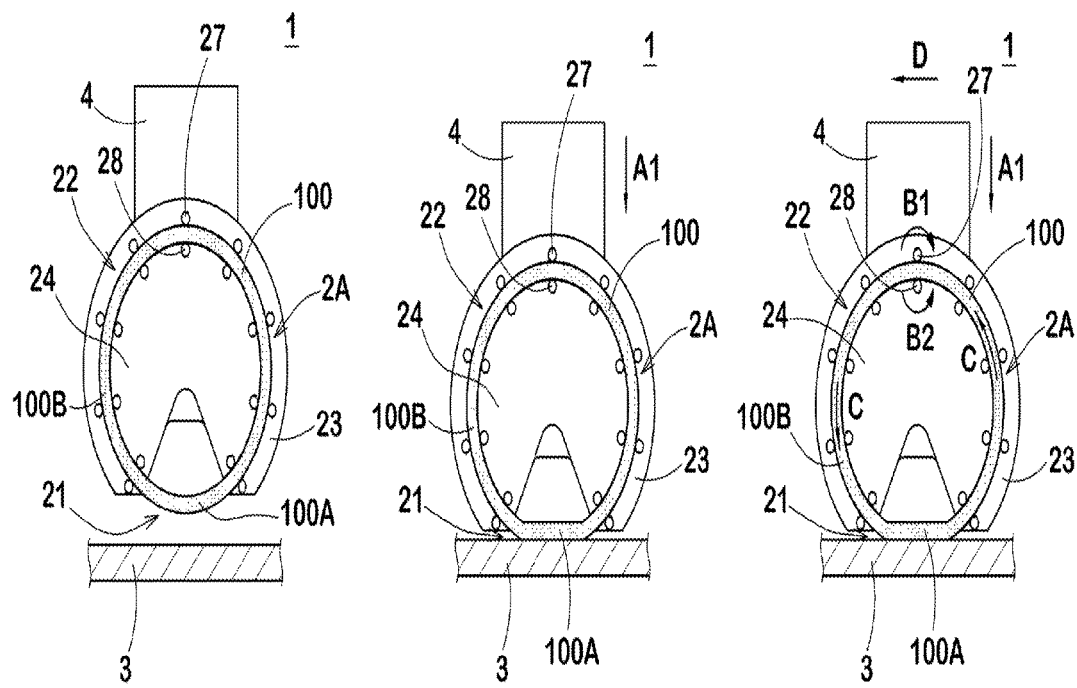

DEVICE FOR MEASURING TREAD RING RIGIDITY AND METHOD FOR MEASURING UNIFORMITY OF TREAD RING

CROSS-REFERENCE TO RELATED APPLICATIONS

The present application is a National Stage of PCT/JP2014/079862, filed Nov. 11, 2014, which claims the benefit of priority to Japanese Patent Applications No. 2013-233338, filed Nov. 11, 2013 and No. 2013-271789, filed Dec. 27, 2013. The entire contents of these applications are incorporated herein by reference.

TECHNICAL FIELD

The present invention relates to a device for measuring tread ring rigidity and a method for measuring uniformity of tread ring.

BACKGROUND ART

Conventionally, in a manufacturing line of pneumatic tires, various characteristics regarding tire uniformity (e.g., RFV, LFV, conicity and the like) are checked before shipment in order to suppress vibration of tires during rolling. When measuring the characteristics regarding tire uniformity, a pneumatic tire is mounted on a measuring rim. For example, vertical rigidity distribution of the tire can be obtained by rotating the rim together with the pneumatic tire on a drum of a uniformity measurement device so that a measurement region of the tire in contact with the drum is moved in the circumferential direction of the tire.

When a load is applied to the pneumatic tire, the measurement region in contact with the drum deforms greatly. Meanwhile, a non-measurement region of the pneumatic tire which is not in contact with the drum deforms less. Thus, the vertical rigidity distribution of the tire generally depends on rigidity of each measurement region properly.

On the other hand, airless tires that include a cylindrical tread ring having a ground contact surface, a hub disposed radially inward of the of the tread ring and being fixable to an axle, and a spoke connecting the tread ring and the hub are known. Airless tires are also required to have excellent uniformity, same as pneumatic tires. Uniformity of completed airless tires may be measured similarly to pneumatic tires by mounting the hub to the measurement device.

Meanwhile, in airless tire, not only eccentric of the tread ring to the hub but also uniformity of the tread ring alone, i.e. vertical rigidity distribution of the tread ring alone in the circumferential direction is believed to affect the uniformity. It is therefore possible to further improve uniformity of airless tires if the vertical rigidity distribution of the tread ring alone is able to be measured.

When the vertical load is applied to the tread ring alone to measure the vertical rigidity of the measurement region of the tread ring which is in contact with the ground, the tread ring unfortunately deforms in an elliptical shape as the whole so that each part of the tread ring generates stress commensurately. For example, in the measurement region as well as the upward region of the measurement region, the compressive stress is generated on an outer peripheral side of the tread ring, and the tensile stress is generated on an inner circumferential side of the tread ring. On the other hand, in other regions, the tensile stress is generated on the outer peripheral side of the tread ring, and compressive stress is generated on the inner circumferential side. Therefore, not only stress generated in the measurement region which is in contact with the ground but also stress generated in the non-measurement region which is not in contact with the ground influences the measured values as the vertical rigidity.

Furthermore, since the technique that rotates a tread ring in the circumferential direction while applying vertical load onto the tread ring was not established, it has been therefore difficult to measure rigidity distribution of a whole length of the tread ring effectively. In particular, the technique that effectively measures rigidity distribution in a whole length of tread rings has been strongly desired in order to inspect rigidity of total or sampled tread rings in a manufacturing line of airless tires.

SUMMARY OF INVENTION

Technical Problem

The present invention has been made in view of the circumstances described above, and has an object to provide a device for measuring a tread ring rigidity and method for measuring uniformity of a tread ring capable of measuring rigidity of a part in the circumferential direction of the tread ring alone.

Solution to Problem

The present invention provides a rigidity measurement device of a tread ring for measuring rigidity of a part in a circumferential direction of the tread ring alone, wherein the tread ring is to be used for an airless tire comprising the tread ring formed in a cylindrical shape having a ground contact surface, a hub disposed radially inward of the tread ring and being fixable to an axle and a spoke for connecting the tread ring to the hub. The device includes a support jig for supporting the tread ring alone. The support jig includes an opening for exposing the part of the tread ring as a measurement region outwardly in a deformable manner, and a restraint portion for restraining a non-measurement region of the tread ring which is a region except the measurement region in a substantially non-deformable manner.

In the rigidity measurement device of the present invention, it is preferable that the support jig is configured to hold the tread ring alone detachably.

In the rigidity measurement device of the present invention, it is preferable that the restraint portion includes an outer supporting portion configured to contact with the ground contact surface of the tread ring in the non-measurement region to restrain the tread ring.

In the rigidity measurement device of the present invention, it is preferable that the outer supporting portion includes an outer ring configured to contact with the ground contact surface of the tread ring in the non-measurement region continuously.

In the rigidity measurement device of the present invention, it is preferable that the restraint portion includes an inner supporting portion configured to contact with a radially inner surface of the tread ring in the non-measurement region to restrain the tread ring.

In the rigidity measurement device of the present invention, it is preferable that the inner supporting portion comprises an inner portion having a column shape configured to contact with the inner surface of the tread ring in the non-measurement region continuously.

In the rigidity measurement device of the present invention, it is preferable that a ratio $Ji/Ro$ of an inner diameter $Ji$ of the outer supporting portion to an outer diameter Ro of the ground contact surface of the tread ring is of from 0.995 to 1.02.

In the rigidity measurement device of the present invention, it is preferable that a ratio Jo/Ri of an outer diameter Jo of the inner supporting portion to an inner diameter Ri of the inner surface of the tread ring is of from 0.99 to 1.03.

In the rigidity measurement device of the present invention, it is preferable that the supporting jig is configured to support the tread ring alone rotatably in the circumferential direction.

In the rigidity measurement device of the present invention, it is preferable that the restraint portion includes a friction reducing means configured to contact with the non-measurement region to reduce friction to the non-measurement region.

In the rigidity measurement device of the present invention, it is preferable that the restraint portion includes an outer supporting portion configured to contact with the ground contact surface of the tread ring in the non-measurement region to restrain the tread ring, and the friction reducing means is provided on the outer supporting portion.

In the rigidity measurement device of the present invention, it is preferable that the friction reducing means includes a plurality of rotatably supported outer rollers each having an outer surface configured to contact with the ground contact surface of the tread ring.

In the rigidity measurement device of the present invention, it is preferable that the restraint portion includes an inner supporting portion configured to contact with a radially inner surface of the tread ring in the non-measurement region to restrain the tread ring, and the friction reducing means is provided on the inner supporting portion.

In the rigidity measurement device of the present invention, it is preferable that the friction reducing means includes a plurality of rotatably supported inner rollers each having an outer surface configured to contact with the ground contact surface of the tread ring.

In the rigidity measurement device of the present invention, it is preferable that a ratio Ji'/Ro of a diameter Ji' of an arc formed by connecting outer contact points of each outer surface of each outer roller which come into contact with the ground contact surface to an outer diameter Ri of the ground contact surface of the tread ring is of from 0.995 to 1.02.

In the rigidity measurement device of the present invention, it is preferable that a ratio Jo'/Ri of a diameter Jo' of an arc formed by connecting inner contact points of each outer surface of each inner roller which come into contact with the inner surface to an inner diameter Ro of the inner surface of the tread ring is of from 0.99 to 1.03.

In the rigidity measurement device of the present invention, it is preferable that the outer rollers are movable in a radial direction of the tread ring.

In the rigidity measurement device of the present invention, it is preferable that the inner rollers are movable in a radial direction of the tread ring.

In the rigidity measurement device of the present invention, it is preferable that the opening of the support jig has a chord length of from 30 to 300 mm.

The present invention further provides a uniformity measurement method of a tread ring for measuring a circumferential uniformity of rigidity of the tread ring alone, wherein the tread ring is to be used for an airless tire comprising the tread ring formed in a cylindrical shape having a ground contact surface, a hub disposed radially inward of the tread ring and being fixable to an axle and a spoke for connecting the tread ring to the hub. The method includes a holding step of holding the tread ring so that a measurement region that is a part of the tread ring in a circumferential direction is kept in a deformable manner while restraining a non-measurement region of the tread ring that is a region except the measurement region, and a measuring step of measuring a deformed state upon applying load on the measurement region. The holding step and the measuring step are conducted in different position in the circumferential direction of the tread ring by moving the measurement region.

The present invention further provides a uniformity measurement method of a tread ring for measuring a circumferential uniformity of rigidity of the tread ring alone, wherein the tread ring is to be used for an airless tire comprising the tread ring formed in a cylindrical shape having a ground contact surface, a hub disposed radially inward of the tread ring and being fixable to an axle and a spoke for connecting the tread ring to the hub. The method includes a holding step of holding the tread ring so that a measurement region that is a part of the tread ring in a circumferential direction is in a deformable manner while restraining a non-measurement region of the tread ring that is a region except the measurement region, and a measuring step of measuring a deformed state upon applying load on the measurement region, the measuring step continuously measures a deformed state while moving the measurement region in different position in the circumferential direction of the tread ring by shifting the tread ring in the circumferential direction.

Advantageous Effects of Invention

The rigidity measurement device of a tread ring in accordance with the present invention includes the support jig for supporting the tread ring alone. The support jig includes the opening for exposing a part of the tread ring as the measurement region outwardly in a deformable manner, and the restraint portion for restraining the non-measurement region of the tread ring which is a region except the measurement region. The rigidity of the tread ring is measured by pressing the ground contact surface of the tread ring of the measurement region which exposes through the opening against a drum, plate and the like. At that time, the restraint portion can restrain the non-measurement region of the tread ring in a substantially non-deformable manner. Since stress is not generated in the non-measurement region of the tread ring, it is possible to measure rigidity of just a part in the circumferential direction of the tread ring alone.

Furthermore, the uniformity measurement method of a tread ring in accordance with the present invention includes the holding step to hold the tread ring and the measuring step to measure a deformed state of the tread ring. In the holding step, the measurement region that is a part of the tread ring in the circumferential direction is kept in a deformable manner while restraining the non-measurement region that is a region except the measurement region. In the measuring step, a deformed state is measured upon applying a load on the measurement region. The holding step and the measuring step are conducted in different position in the circumferential direction of the tread ring by moving the measurement region. Thus, it is possible to measure uniformity of the tread ring alone by measuring a deformed state of a whole length of the tread ring.

Furthermore, the uniformity measurement method of a tread ring in accordance with the present invention includes the holding step to hold the tread ring and the measuring step to measure a deformed state of the tread ring. In the holding step, the measurement region that is a part of the tread ring in the circumferential direction is kept in deformable manner while restraining the non-measurement region that is a region except the measurement region. In the measuring step, a deformed state is measured upon applying a load on the measurement region. Furthermore, in the measuring step, the measurement region is moved in different position in the circumferential direction of the tread ring by shifting the tread ring in the circumferential direction. Thus, it is possible to measure uniformity of the tread ring alone effectively by measuring a deformed state of a whole length of the tread ring continuously.

BRIEF DESCRIPTION OF DRAWINGS

FIG. 13 is a side view illustrating a uniformity measurement method of the tread ring of an airless tire using the support jig of FIG. 6.

DESCRIPTION OF EMBODIMENTS

Hereinafter, an embodiment of the present invention will be described with reference to the accompanying drawings.

Figure 1:
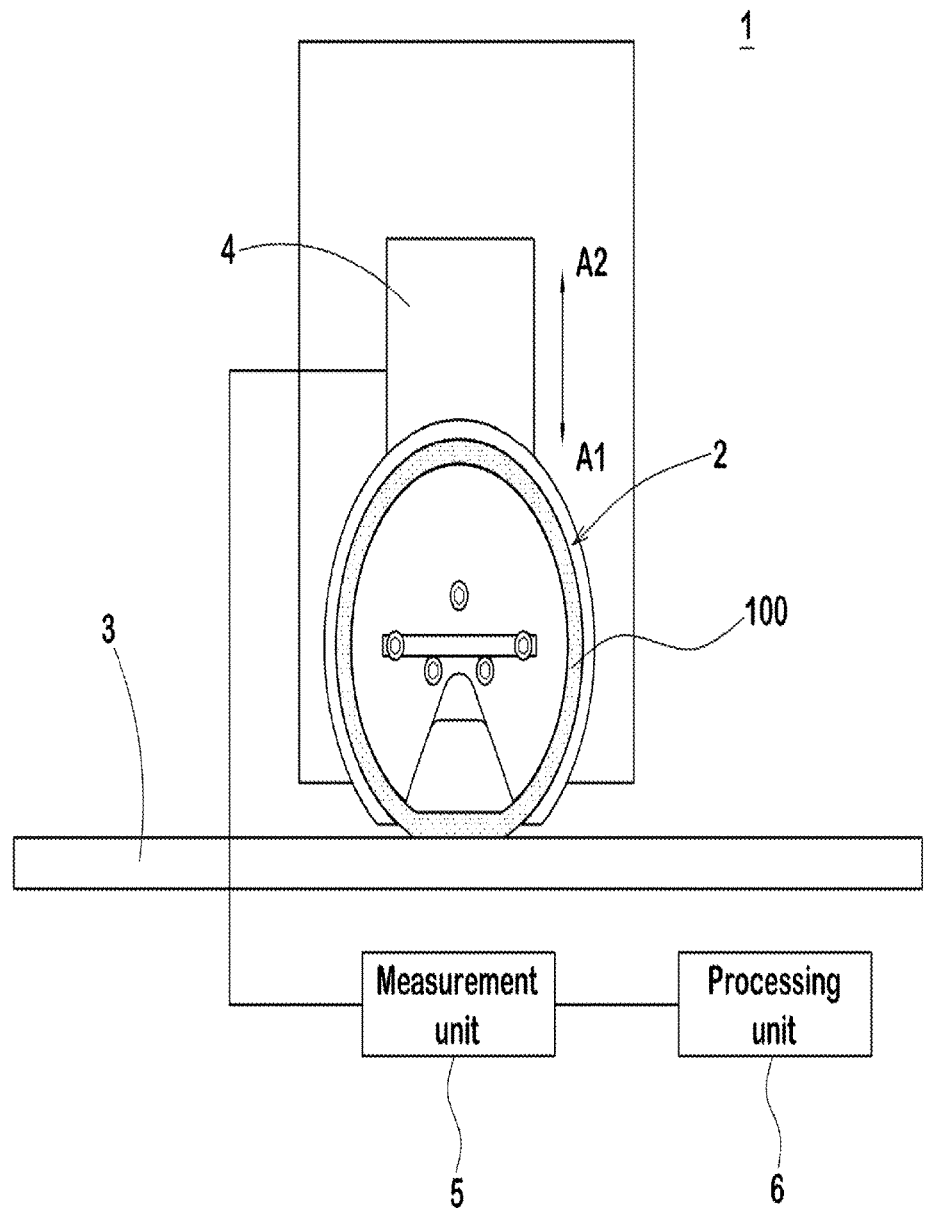
FIG. 1 is a side view illustrating an embodiment of a rigidity measurement device of a tread ring of the present invention.

FIG. 1 is a side view illustrating an embodiment of a rigidity measurement device 1 of the tread ring (hereinafter, simply referred to as "rigidity measurement device") of the present invention. As illustrated in FIG. 1, the rigidity measurement device 1 in accordance with the present embodiment is a device for measuring rigidity of a part in a circumferential direction of the tread ring 100 alone that is used for an airless tire.

The rigidity measurement device 1, for example, includes a support jig 2 for holding the tread ring 100, a flat plate (road portion) 3 on which the tread ring 100 is to be pressed, a driving unit 4 for driving the support jig 2 toward the flat plate 3 in the vertical direction, a measurement unit 5 that measures vertical force acted on the flat plate 3, and a processing unit 6 that calculates rigidity of the tread ring 100 based on the force measured by the measurement unit 5. Here, the tread ring 100 alone is a ring body before being integrated with a spoke and a hub together as an airless tire.

Instead of the flat plate 3 on which the tread ring 100 is to be pressed, a cylindrical drum may be used. The driving unit 4 can press the tread ring 100 against the flat plate 3 through the support jig 2. Thus, the tread ring 100, for example, is given deformation corresponding to vertical flexure of an airless tire. The displacement of the support jig 2 caused by the driving unit 4, for example, is inputted to the processing unit 6 through the measurement unit 5.

The measurement unit 5 may be arranged at the side of the driving unit 4. The processing unit 6 calculates vertical rigidity of the tread ring 100 based on displacement of the support jig 2 and force measured by the measurement unit 5.

The support jig 2 may be drove in lateral or front-back direction by the driving unit 4. In this case, the measurement unit 5 measures force acted on the flat plate 3 in lateral or front-back direction.

Figure 2:
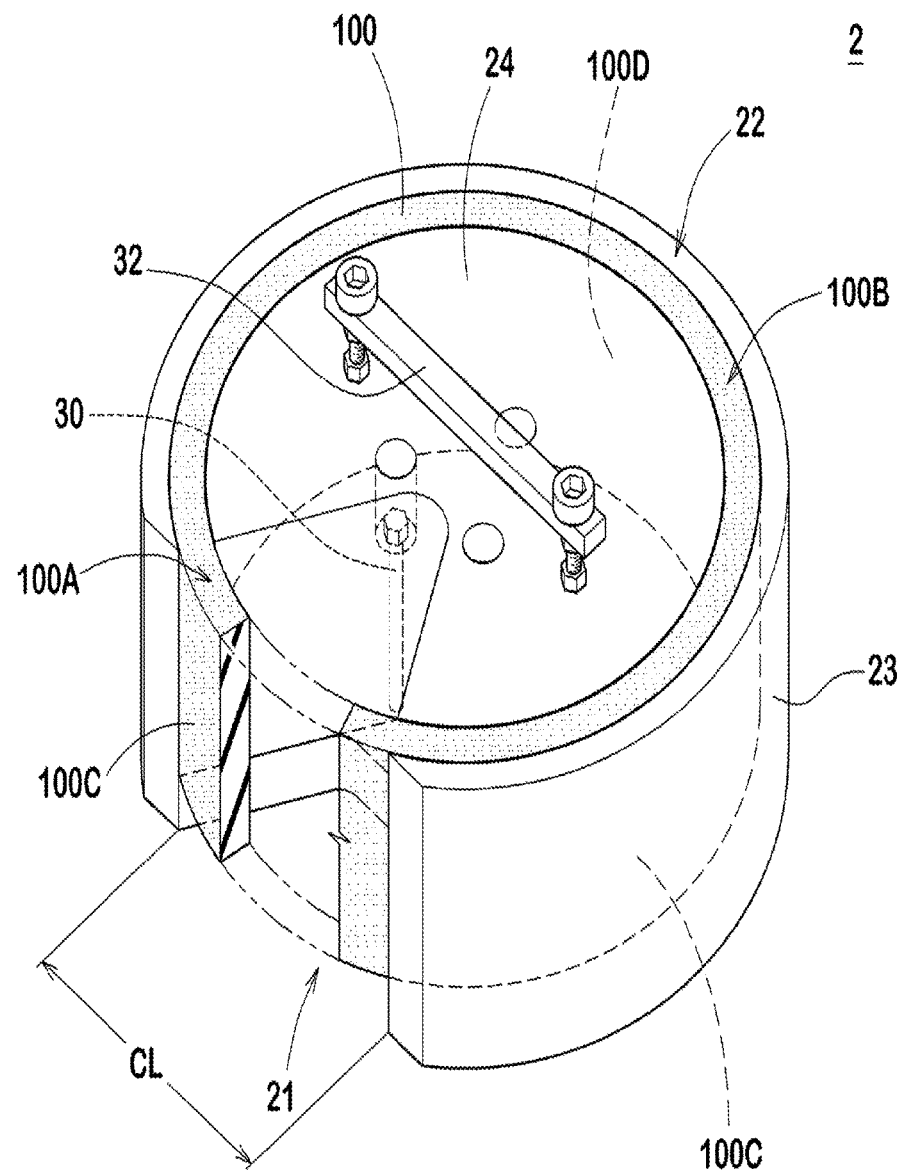
FIG. 2 is a perspective view illustrating a support jig of the rigidity measurement device of FIG. 1.
Figure 3:
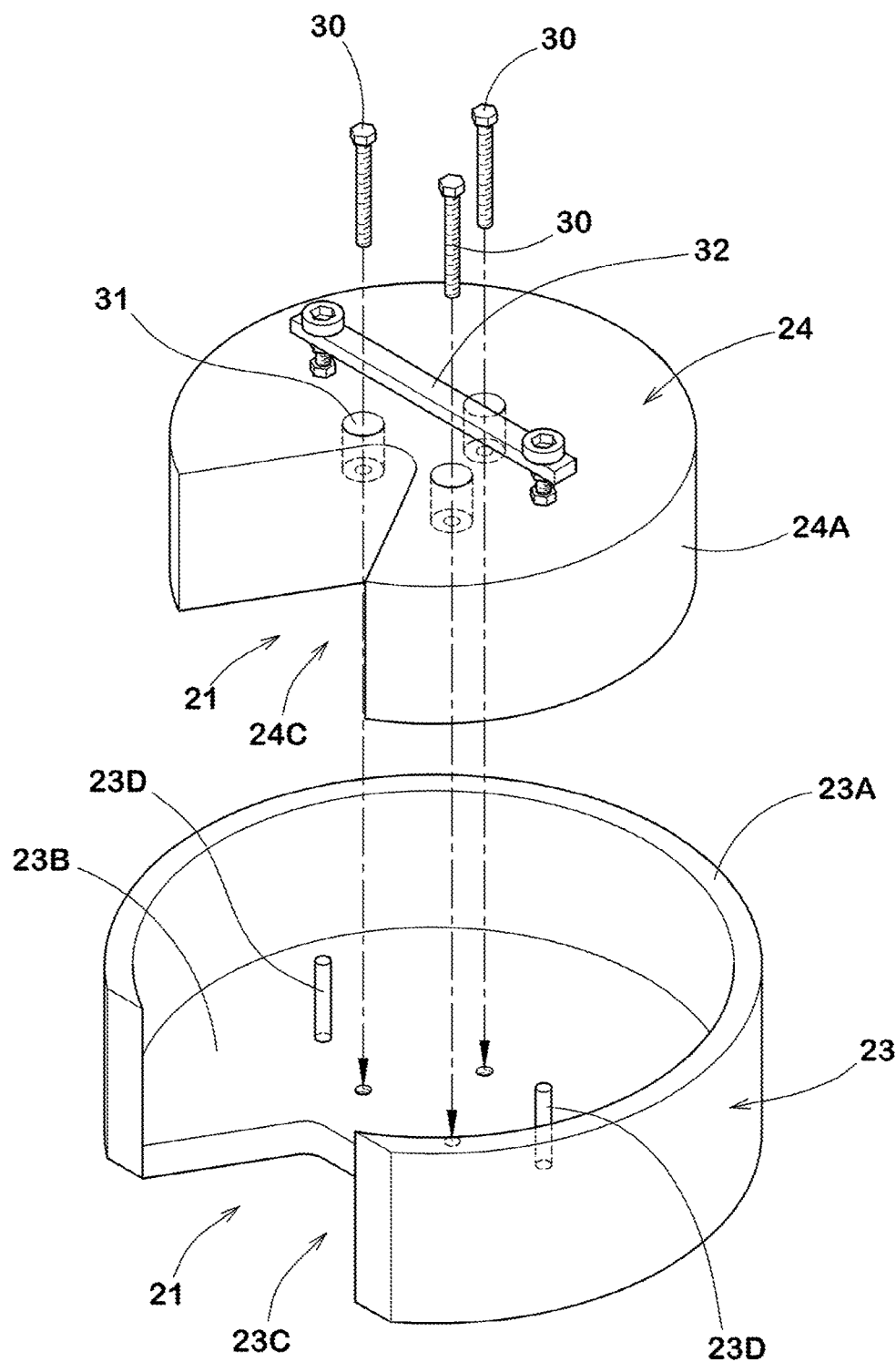
FIG. 3 is an assembled perspective view of the support jig of FIG. 2.

FIG. 2 and FIG. 3 illustrate a construction of the support jig 2. The support jig 2 may hold the tread ring 100 detachably. The support jig 2 includes an opening 21 for exposing the part of the tread ring 100 as a measurement region 100A outwardly in a deformable manner, and a restraint portion 22 for restraining a non-measurement region 100B of the tread ring 100 which is a region except the measurement region 100A in a substantially non-deformable manner. Since the restraint portion 22 restrains the non-measurement region 100B of the tread ring 100, stress is not generated in the non-measurement region 100B of the tread ring 100. It is therefore possible to measure rigidity of just the measurement region 100A which is a part in the circumferential direction of the tread ring 100 alone.

A chord length CL of the opening 21 which exposes the tread ring 100, for example, is set according to a ground contact length of the airless tire to be measured. In general, passenger cars, which are easy to travel in high speed and are sensitive to vibrations, require better uniformity performance to tires. In view of the above, the chord length CL is preferably in a range of from 30 to 300 mm, for example, in response to a ground contact length of passenger car tires. When the chord length CL is less than 30 mm, it may be difficult to measure rigidity of the tread ring 100 with sufficient load due to excessive short ground contact length. On the other hand, when the chord length CL is more than 300 mm, it may be difficult to prevent the non-measurement region 100B from deformation because the support jig may not restrain the tread ring 100 in a wide range.

The restraint portion 22 includes an outer supporting portion 23 disposed outward of the ground contact surface 100C of the non-measurement region 100B of the tread ring 100. The restraint portion 22 also includes an inner supporting portion 24 disposed inward of the inner surface 100D of the non-measurement region 100B of the tread ring 100.

The outer supporting portion 23 restrains the tread ring 100 from radially outward by contacting with the ground contact surface 100C of the tread ring 100 in the non-measurement region 100B. The outer supporting portion 23 includes an outer ring 23A configured to a circumferentially extending ring shape within the non-measurement region continuously and a side edge plate 23B disposed axially one end of the outer ring 23A.

The outer ring 23A may contact with a substantially whole range of the ground contact surface 100C of the tread ring 100 of the non-measurement region 100B so as to restrain the tread ring 100 from radially outward side. Thus, the substantially whole range of the ground contact surface 100C of the non-measurement region 100B of the tread ring 100 is restrained by the outer ring 23A, and then the non-measurement region 100B is kept in a non-deformable manner. The outer supporting portion 23 is not limited to the aspect illustrated in FIG. 3, but may be formed in a circumferentially intermittent manner arrange radially outward of the non-measurement region 100B of the tread ring 100, for example.

The side edge plate 23B is integrally formed with the outer ring 23A to suppress deformation of the outer ring 23A. The tread ring 100 is mounted in the jig so that one of edges of the tread ring 100 comes into contact with the side edge plate 23B of the outer supporting portion 23 in a whole range of the non-measurement region 100B. Thus, eccentricity between the tread ring 100 and the outer supporting portion 23 may be prevented. The side edge plate 23B has a cut 23C at a position corresponding to the opening 21. By providing the cut 23C on the side edge plate 23B, it may avoid a contact between the edge of the tread ring 100 and the side edge plate 23B of the outer supporting portion 23. Therefore, deformation of the measurement region 100A is not interrupted.

The side edge plate 23B is integrated with the inner supporting portion 24. A pair of positioning members 23D for defining the relative position between the outer supporting portion 23 and the inner supporting portion 24 are fixed to the side edge plate 23B. In this embodiment, the positioning members 23D are configured as a pair of pins, for example.

Figure 4A:
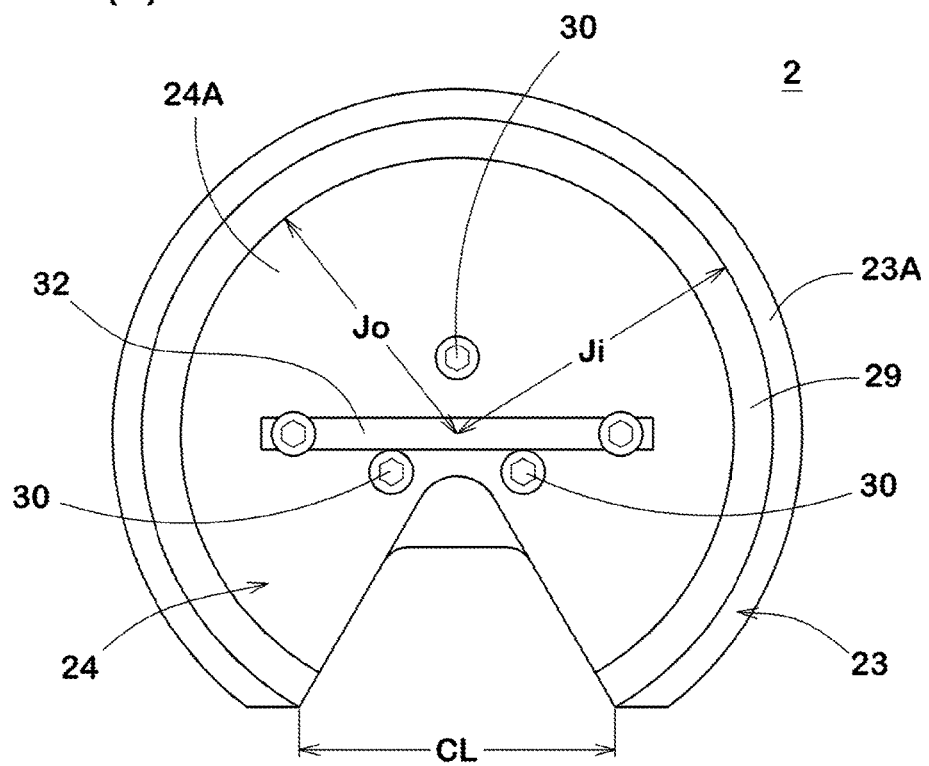
FIG. 4A is a side view of the support jig of FIG. 2.
Figure 4B:
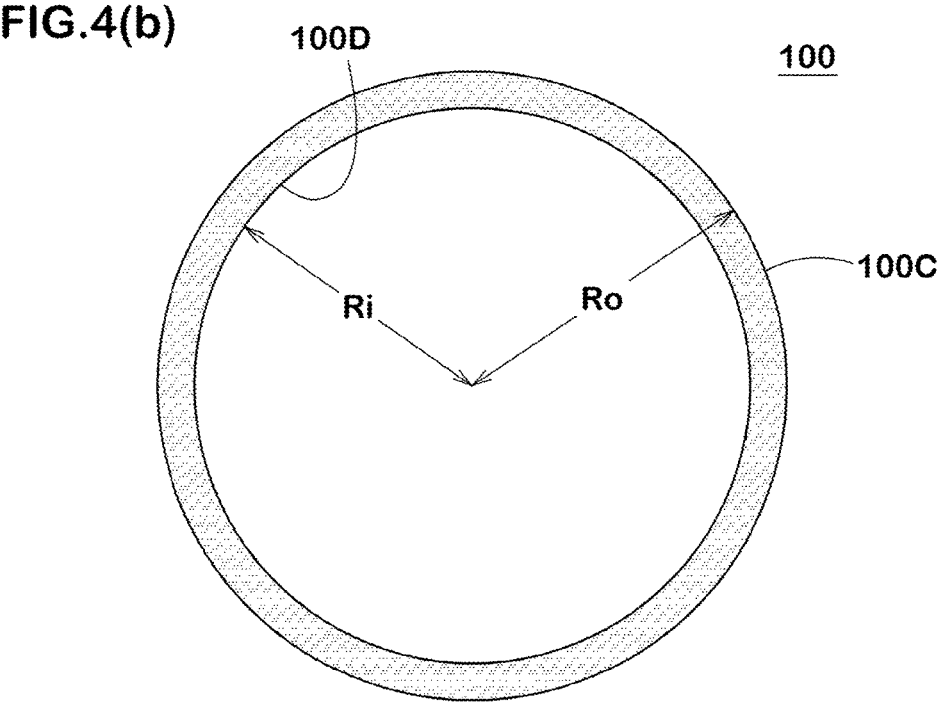
FIG. 4B is a side view of the tread ring.

FIG. 4A is a side view of the support jig 2 of FIG. 2, and FIG. 4B is a side view of the tread ring 100 in a pre-mounting state to the support jig 2. When the outer supporting portion 23 and the inner supporting portion 24 are integrated with each other at the proper position, a groove 29 is defined between the outer supporting portion 23 and the inner supporting portion 24. The non-measurement region 100B of the tread ring 100 is installed in the groove 29 and is restrained by both the outer supporting portion 23 and the inner supporting portion 24.

Preferably, a ratio Ji/Ro of the inner diameter Ji of the outer supporting portion 23A to the outer diameter Ro of the ground contact surface 100C of the tread ring 100 is of from 0.995 to 1.02.

When the ratio Ji/Ro is less than 0.995, it may be difficult to be fitted the tread ring 100 on an radially inner surface of the outer ring 23A of the outer supporting portion 23. On the other hand, when the ratio Ji/Ro is more than 1.02, it may be difficult to suppress deformation of the non-measurement region 100B of the tread ring 100 sufficiently because a gap between the ground contact surface 100C of the tread ring 100 and an inner surface of the outer ring 23A of the outer supporting portion 23 becomes large.

As illustrated in FIG. 2, the inner supporting portion 24 restrains the tread ring 100 from radially inward by contacting with the inner surface 100D of the tread ring 100 in the non-measurement region 100B. The inner supporting portion 24 includes an inner ring 24A configured to a column shape having a circumferentially extending outer surface within the non-measurement region continuously. The inner ring 24A may contact with a substantially whole range of the inner surface 100D of the tread ring 100 of the non-measurement region 100B so as to restrain the tread ring 100 from radially inward side. Thus, the substantially whole range of the inner surface 100D of the non-measurement region 100B of the tread ring 100 is restrained by the inner ring 24A, and then the non-measurement region 100B is kept in the non-deformable manner more effectively.

As illustrated in FIG. 3, the inner ring 24A has a cut 24C in a position corresponding to the opening 21. By providing the cut 24C on the inner ring 24A, it may avoid a contact between the tread ring 100 and the inner ring 24A of the inner supporting portion 24. Therefore, deformation of the measurement region 100A is not interrupted. The inner supporting portion 24 is not limited to the aspect illustrated in FIG. 3, but may be formed in a circumferentially intermittent manner arranged radially inward of the non-measurement region 100B of the tread ring 100, for example.

The inner supporting portion 24 is integrated with the side edge plate 23B of the outer supporting portion 23 using a bolt 30 and the like. The bolt 30 may be inserted from a hole 31 provided on an end surface of the inner ring 24A of the inner supporting portion 24. The end surface of the inner ring 24A of the inner supporting portion 24 may be provided with a handle 32 to grip the support jig 2 if necessary. The end surface of the inner ring 24A of the inner supporting portion 24 may be provided with a flange that comes into contact with an edge of the tread ring 100, if necessary. The flange may position the tread ring 100 to the support jig 2 in correct position in cooperated with the side edge plate 23B of the outer supporting portion 23.

As illustrated in FIG. 4, preferably, a ratio Jo/Ri of the outer diameter Jo of the inner ring 24A of the inner supporting portion 24 to the inner diameter Ri of the inner surface 100D of the tread ring 100 is of from 0.99 to 1.03.

When the ratio Jo/Ri is less than 0.99, it may be difficult to suppress deformation of the non-measurement region 100B of the tread ring 100 sufficiently because a gap between the inner surface 100D of the tread ring 100 and an outer surface of the inner ring 24A of the inner supporting portion 24 becomes large. On the other hand, when the ratio Jo/Ri is more than 1.03, it may be difficult to be fitted the tread ring 100 on the outer surface of the inner ring 24A of the inner supporting portion 24.

Figure 5A:
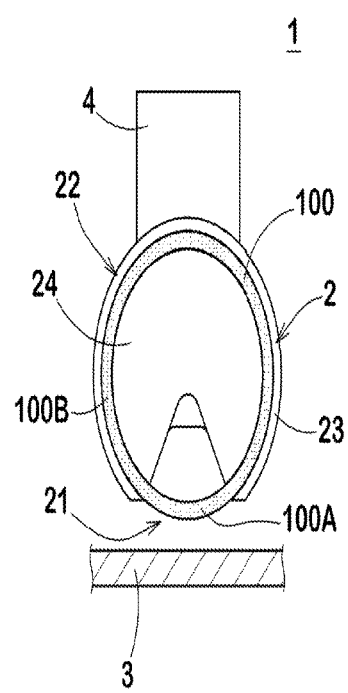
FIG. 5 is a side view illustrating a uniformity measurement method of a tread ring of an airless tire using the rigidity measurement device of FIG. 1.
Figure 5B:
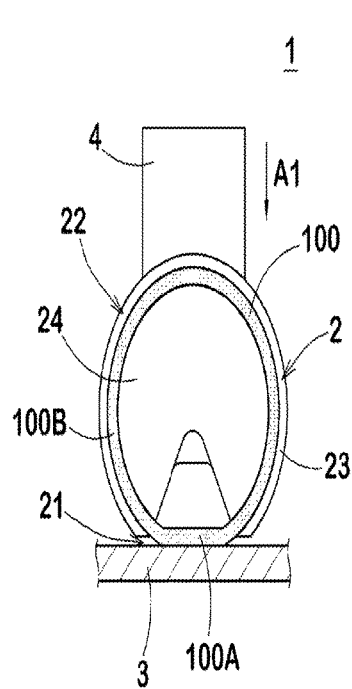
Figure 5C:
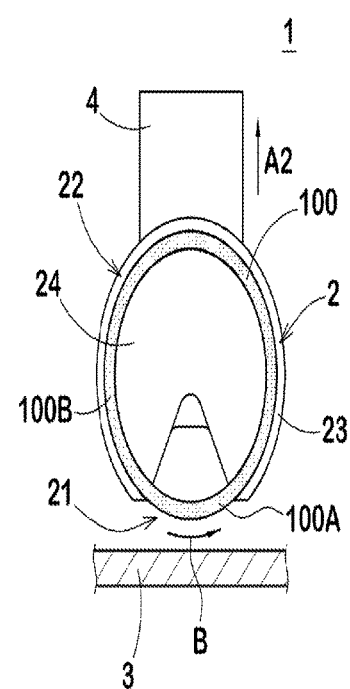

FIGS. 5A to 5C illustrate a uniformity measurement method of the tread ring 100 of an airless tire using the rigidity measurement device 1. The uniformity measurement method of the tread ring 100 includes a holding step to hold the tread ring 100 and a measuring step to measure a deformed state of the tread ring 100.

As illustrated in FIG. 5A, in the holding step, the tread ring 100 is held by the support jig 2. That is to say, the tread ring 100 is held so that the non-measurement region 100B except the measurement region 100A is restrained by the restraint portion 22 of the support jig 2. At that time, the measurement region 100A that is a part in the circumferential direction is exposed from the opening 21 of the support jig 2 in a deformable manner.

As illustrated in FIG. 5B, in the measuring step, the support jig 2 is driven by the driving unit 4 to move toward the flat plate 3, i.e. in the direction of the arrow A1, in order to apply a load to the measurement region 100A of the tread ring 100. At that time, since the non-measurement region 100B is kept in the non-deformable manner by the restraint portion 22 of the support jig 2, only the measurement region 100A deforms and generate stress. In the measuring step, the displacement of the support jig 2 and the force acted on the flat plate 3 are measured as for a deformed state of the tread ring 100.

Then, as illustrated in FIG. 5C, the support jig 2 is driven in opposite direction to the flat plate 3, i.e. in the direction of the arrow A2, to separate the tread ring 100 from the flat plate 3. Then, the tread ring 100, for example, is rotated in the direction of the arrow B in the circumferential direction of the tread ring 100 with respect to the support jig 2. Thus, new measurement region 100A is set by shifting the previous measurement region 100A with a rotational angle. That is, the measurement region 100A is moved in different position in the circumferential direction of the tread ring 100. When it is difficult to rotate the tread ring 100 due to friction among the tread ring 100, the outer supporting portion 23 and the inner supporting portion 24, the tread ring 100 may be shifted by removing the inner supporting portion 24 from the outer supporting portion 23. Since then a deformed state of the tread ring 100 over the entire length is measured by repeating the processes illustrated in FIGS. 5A to 5C.

Figure 6:
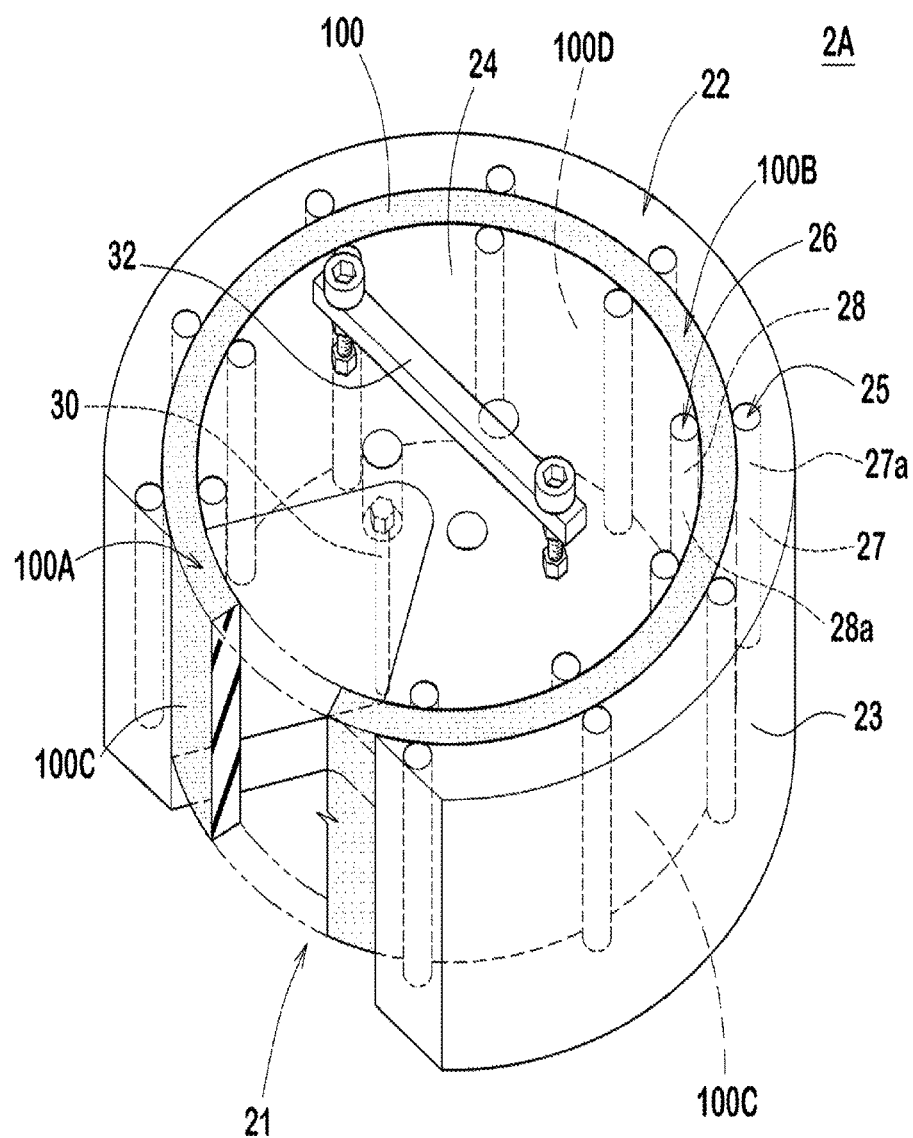
FIG. 6 is a perspective view illustrating the support jig in accordance with another embodiment of the rigidity measurement device of the present invention.
Figure 7:
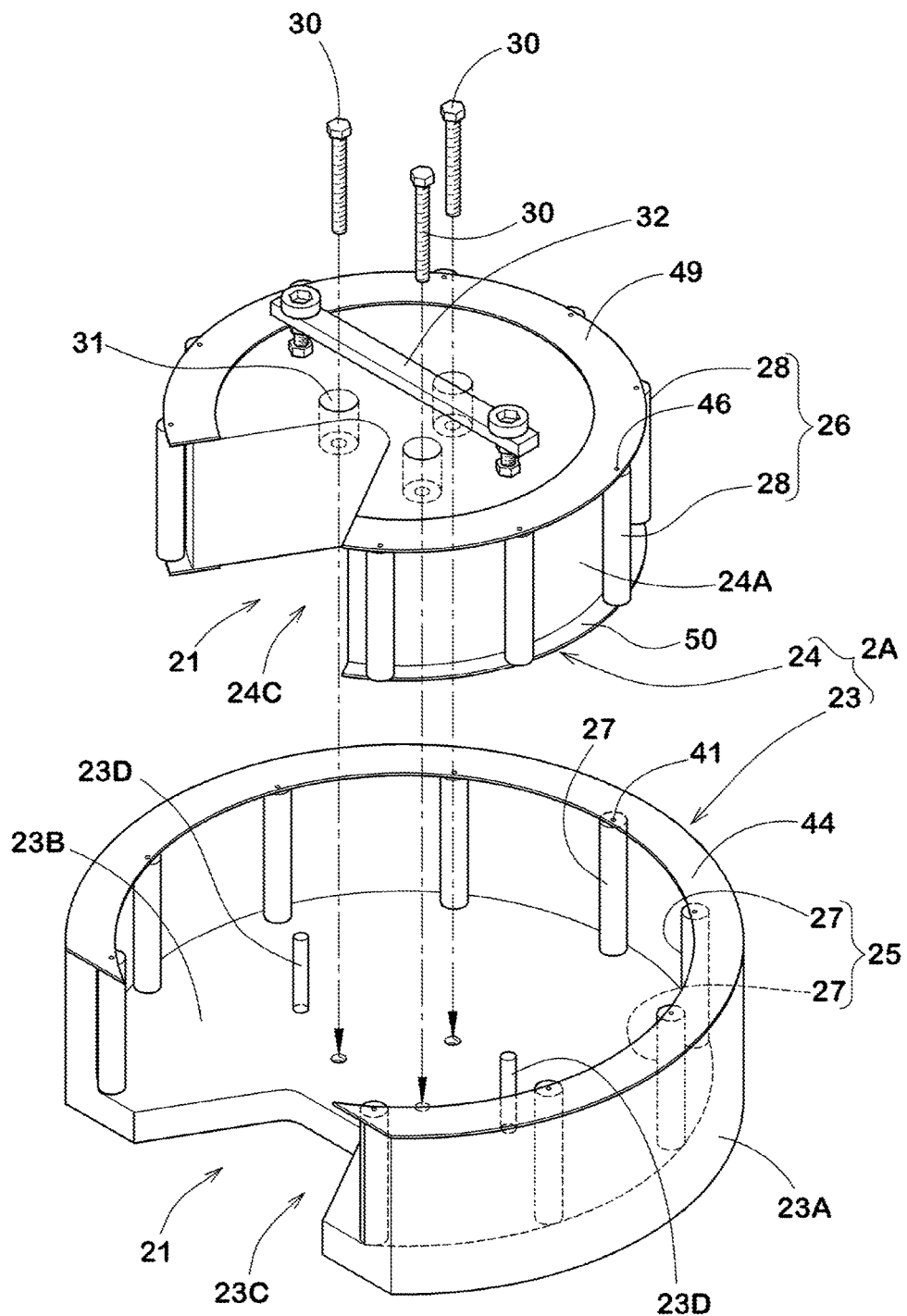
FIG. 7 is an assembled perspective view of the support jig of FIG. 6.

FIG. 6 and FIG. 7 illustrate a configuration of the support jig 2A in accordance with another embodiment of the invention. In the rigidity measurement device in accordance with the present embodiment, the configuration of the rigidity measurement apparatus illustrated in FIGS. 1 to 5 described above may be employed as a portion or element that is not described below.

The support jig 2A can support the tread ring 100 detachably. The support jig 2A includes the opening 21 to expose the measurement region 100A of the tread ring 100 outwardly in a deformable manner and the restraint portion 22 for restraining the non-measurement region 100B of the tread ring 100 in a substantially non-deformable manner. The restraint portion 22 includes the outer supporting portion 23 disposed outward of the ground contact surface 100C of the non-measurement region 100B, the inner supporting portion 24 disposed inward of the inner surface 100D of the non-measurement region 100B and friction reducing means 25 and 26 for reducing friction against the non-measurement region 100B.

The outer supporting portion 23 can restrain the non-measurement region 100B of the tread ring 100 from the radially outward side. The outer supporting portion 23 includes the outer ring 23A and the side edge plate 23B disposed axially one end of the outer ring 23A as illustrated in FIG. 7. The inner side of the outer supporting portion 23 is provided with the friction reducing means 25.

The outer ring 23A supports the friction reducing means 25. The side edge plate 23B is integrated with the outer ring 23A to suppress deformation of the outer ring 23A. The side edge plate 23B is fixed to the inner supporting portion 24.

The side edge plate 23B has the cut 23C in the position corresponding to the opening 21. The side edge plate is provided with the positioning members 23D in a projection manner.

The friction reducing means 25 includes a rotatably supported outer roller 27. A plurality of the outer rollers 27 are spaced in the circumferential direction with a gap. The outer rollers 27 include outer surfaces 27a that circumscribe the ground contact surface 100C of the tread ring 100. The outer supporting portion 23 restrains the ground contact surface 100C of the non-measurement region 100B of the tread ring 100 from radially outward side through the outer rollers 27.

The friction reducing means 25 may include a so-called endless track shape of a belt may be provided in addition to the above mentioned outer roller 27, for example.

As illustrated in FIG. 6, the inner supporting portion 24 restrains the non-measurement region 100 of the tread ring 100 from radially inner side. The inner supporting portion 24 is configured as the inner ring 24A in a column shape (see FIG. 7). The inner supporting portion 24 is provided with the friction reducing means 26 on its radially outer side. The friction reducing means 26 is supported by the inner ring 24A.

The friction reducing means 26 includes a rotatably supported inner roller 28. A plurality of the inner rollers 28 are spaced in the circumferential direction with a gap. The inner rollers 28 include outer surfaces 28a that is inscribed in the inner surface 100D of the tread ring 100. The inner supporting portion 24 restrains the inner surface 100D of the non-measurement region 100B of the tread ring 100 from radially inward side through the inner rollers 27.

The friction reducing means 26 may include a so-called endless track shape of a belt may be provided in addition to the above mentioned inner rollers 28, for example.

In this embodiment, since the restraint portion 22 is provided with the friction reducing means 25 and 26 for reducing friction against the non-measurement region 100B of the tread ring 100, the tread ring 100 is easy to be shifted in the circumferential direction while restraining the non-measurement region 100B in the support jig 2A. Thus, the measurement region moves in different position in the circumferential direction of the tread ring 100. Accordingly, it is possible to measure the rigidity of just a measurement region 100A over the entire length continuously and effectively without removing the tread ring 100 from the support jig 2A.

The support jig 2A may be configured to include either one of the friction reducing means 25 or 26 to restrain the tread ring 100. However, it is preferable that the friction reducing means 25 and 26 are positioned on the outer and inner sides of the tread ring 100 as the present embodiment in order to suppress the deformation of the tread ring 100 restrained and to rotate the tread ring 100 smoothly.

As illustrated in FIG. 7, the inner ring 24A has the cut 24C in the position corresponding to the opening 21.

The inner supporting portion 24 is integrated with the outer supporting portion 23 using the blot 30 and the like, for example. The inner supporting portion 24 is provided with the handle 32 on an end surface of the inner ring 24A, if necessary.

Figure 8A:
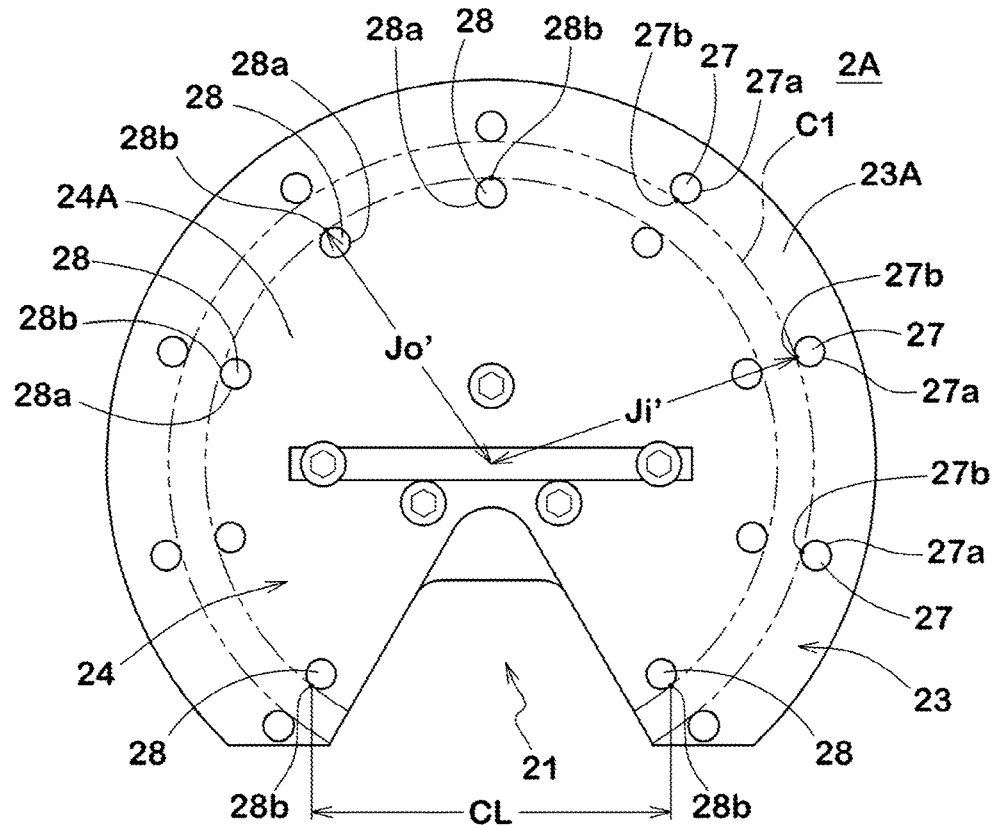
FIG. 8A is a side view of the support jig of FIG. 6.
Figure 8B:
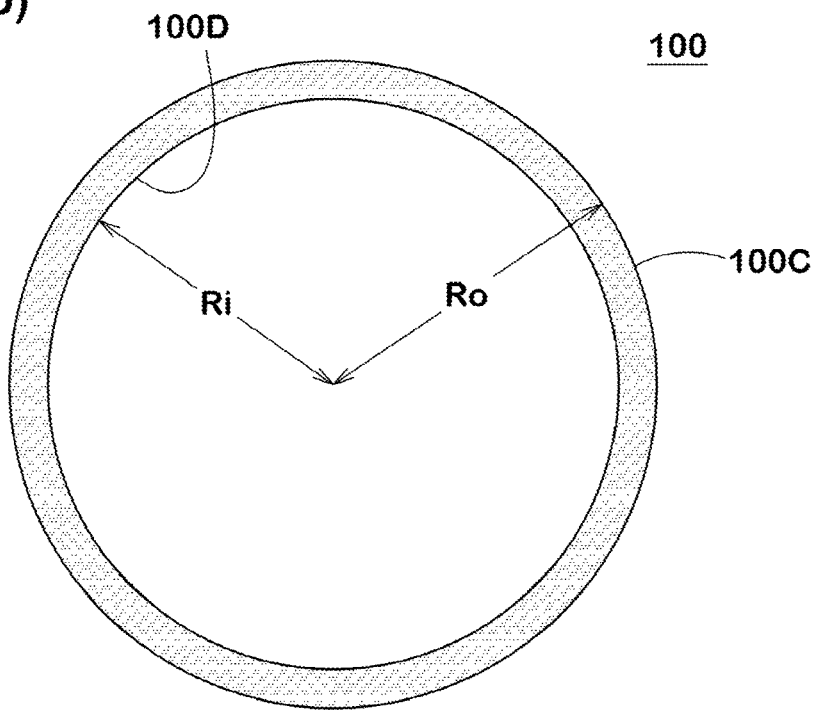
FIG. 8B is a side view of the tread ring.

FIG. 8A illustrates a side view of the support jig 2A, and FIG. 8B illustrates a side view of the tread ring 100 before attaching to the support jig 2A. When the outer supporting portion 23 and the inner supporting portion 24 are fixed with each other in a proper relative position, the outer rollers 27 and the inner rollers 28 arranged on respective circumferential lines along the circumferential direction of the tread ring 100 so that the outer rollers 27 and the inner rollers 28 face one another. Thus, the tread ring 100 is restrained between the outer rollers 27 and the inner rollers 28 to suppress deformation of the tread ring 100 effectively.

Preferably, a ratio Ji'/Ro is of from 0.995 to 1.02, where "Ji'" is a diameter of an arc C1 formed by connecting outer contact points 27b of each outer surface 27a of each outer roller 27 which come into contact with the ground contact surface 100C of the tread ring 100, and "Ro" is an outer diameter of the ground contact surface 100C of the tread ring 100.

When the ratio Ji'/Ro is less than 0.995, it may be difficult to install the tread ring 100 into a space of radially inward of the outer supporting portion 23. On the other hand, when the ratio Ji'/Ro is more than 1.02, since a gap between the ground contact surface 100C of the tread ring 100 and outer surfaces 27a of the outer rollers 27 becomes large, it may be difficult to restrain the non-measurement region 100B of the tread ring 100 sufficiently.

The outer contact points 27b mean positions that are nearest to an axis of the tread ring 100 (the outer ring 23A) on the outer surfaces 27a of the outer rollers 27.

Preferably, a ratio Jo'/Ri is of from 0.99 to 1.03, where "Jo'" is a diameter of an arc C2 formed by connecting inner contact points 28b of each outer surface 28a of each inner roller 28 which come into contact with the inner surface 100D of the tread ring 100, and "Ri" is an inner diameter of the inner surface 100D of the tread ring 100.

When the ratio Jo'/Ri is less than 0.99, since a gap between the inner surface 100D of the tread ring 100 and the outer surfaces 28a of the inner rollers 28 becomes large, it may be difficult to restrain the non-measurement region 100B of the tread ring 100 sufficiently. On the other hand, when the ratio Jo'/Ri is more than 1.03, it may be difficult to install the tread ring 100 into a space of radially outward of the inner supporting portion 24. Furthermore, it may be difficult to rotate the tread ring 100 in the support jig 2A.

The inner contact points 28b mean positions that are farthest from the axis of the tread ring 100 (the inner ring 24A) on the outer surfaces 28a of the inner rollers 28.

The inner supporting portion 24 exposes the measurement region 100A of the tread ring 100 from a space between a pair of inner contact points 28b of the inner rollers 28 arranged on both sides of the opening 21. That is, the opening 21 of the support jig 2A exposes the tread ring 100 in the chord length CL which is a distance between a pair of inner contact points 28b of the inner rollers 28 arranged on both sides of the opening 21.

The chord length CL which exposes the tread ring 100, for example, is set according to a ground contact length of the airless tire to be measured. The chord length CL in accordance with the present embodiment is preferably in a range of from 30 to 300 mm, for example, same as the embodiment illustrated in FIG. 2.

Figure 9:
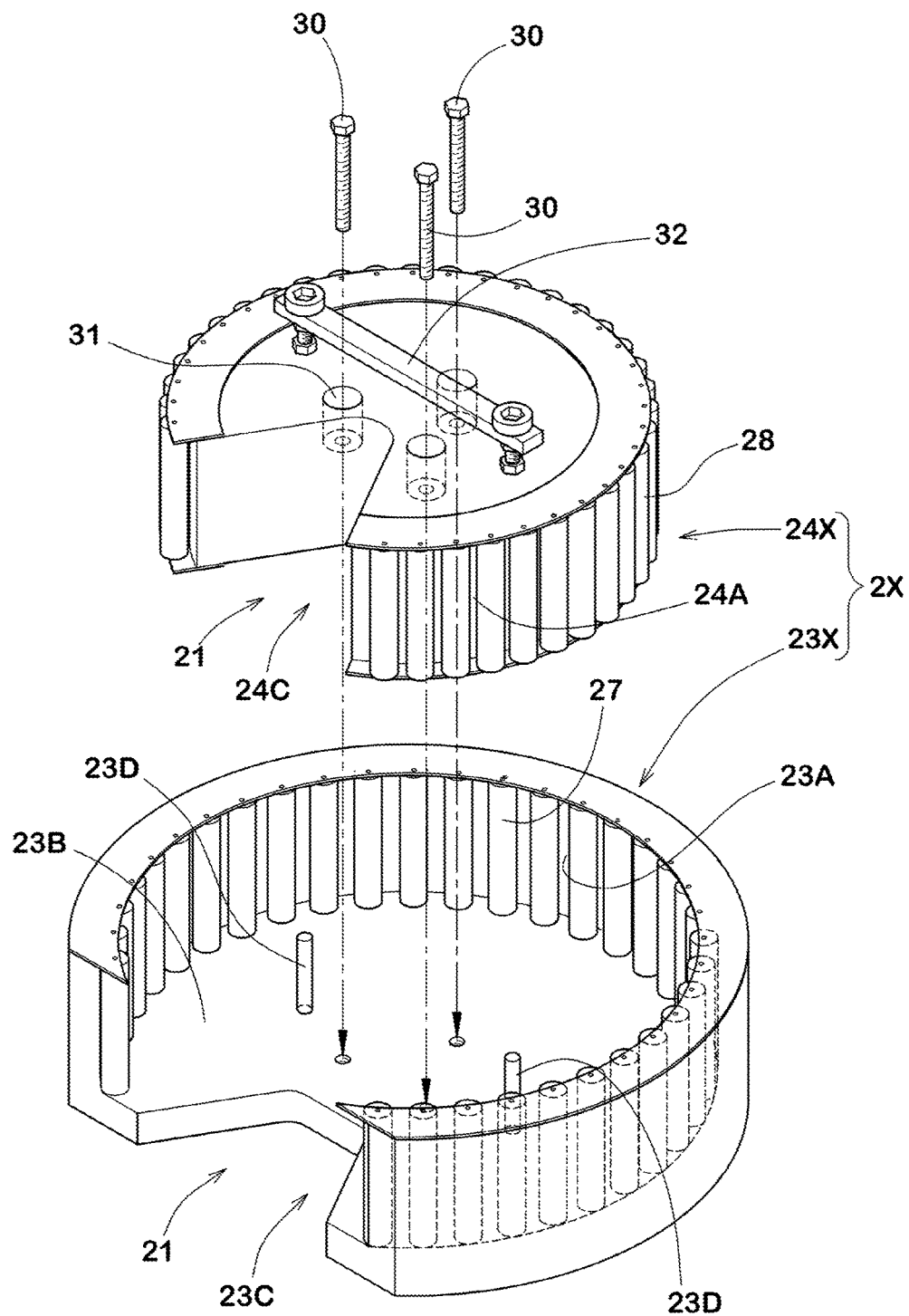
FIG. 9 is an assembled perspective view illustrating a modified example of the support jig of FIG. 7.

FIG. 9 illustrates the support jig 2X which is a modified example of the support jig 2A illustrated in FIG. 7. The support jig 2X includes the outer supporting portion 23X and the inner supporting portion 24X.

The outer supporting portion 23X is different from the outer supporting portion 23 in that the outer rollers 27 are provided on the inner side of the outer ring 23A almost without a gap. Similarly, the inner supporting portion 24X is different from the inner supporting portion 24 in that the inner rollers 28 are provided on the outer side of the inner ring 24A almost without a gap.

According to the support jig 2X, since a lot of outer rollers 27 and inner rollers 28 are able to come into contact with the tread ring 100 to restrain the tread ring 100 in a wide range, deformation of the non-measurement region 100B can further be suppressed. In addition, the tread ring 100 can rotate more smoothly within the support jig 2A.

Figure 10:
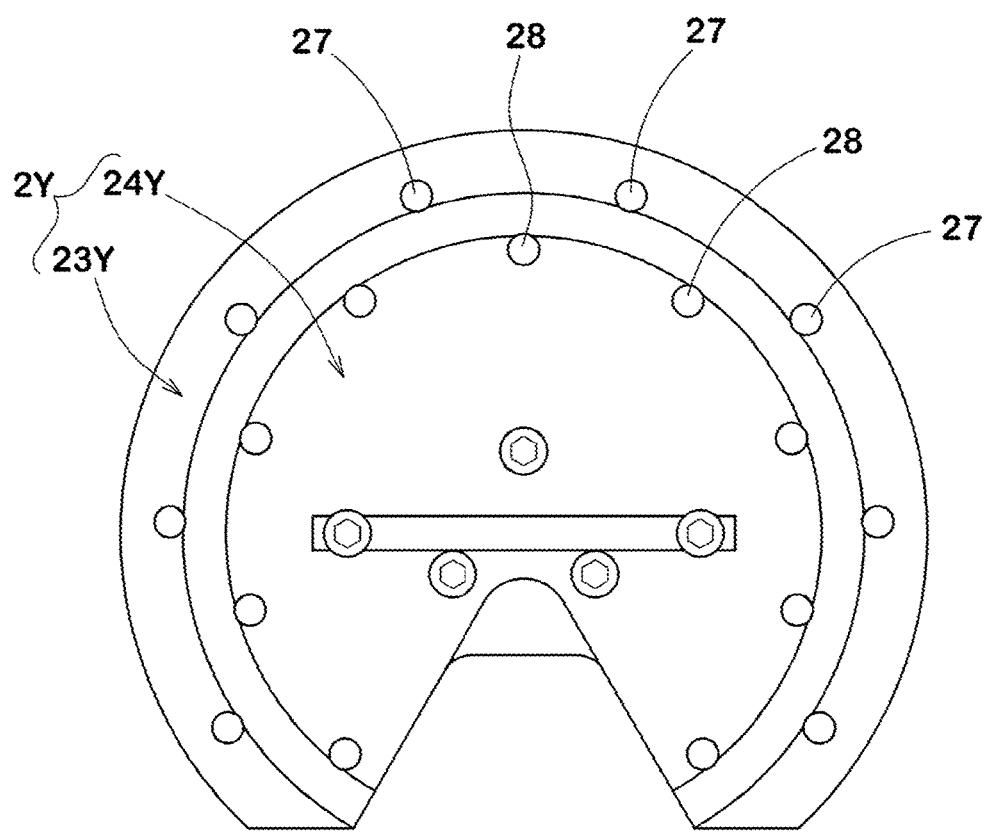
FIG. 10 is a side view illustrating another modified example of the support jig of FIG. 7.

FIG. 10 illustrates the support jig 2Y which is another modified example of the support jig 2X illustrated in FIG. 7. The support jig 2Y includes the outer supporting portion 23Y and the inner supporting portion 24Y.

In the support jig 2Y, the number of the inner rollers 28 provided on the inner supporting portion 24Y is less than the number of the outer rollers 27 provided on the outer supporting portion 23Y. Furthermore, each inner roller 28 is located between a pair of circumferentially adjacent outer rollers 27 in a staggered manner, i.e. the outer rollers 27 and the inner rollers 28 are alternately arranged. These features are different from the support jig 2A.

According to the support jig 2Y, friction between the ground contact surface 100C and the restraint portion 22 can further be reduced while suppressing deformation of the non-measurement region 100B of the tread ring 100. In the support jig 2Y, the outer roller 27 and the inner roller 28 may be installed more, similar to the support jig 2X.

Figure 11:
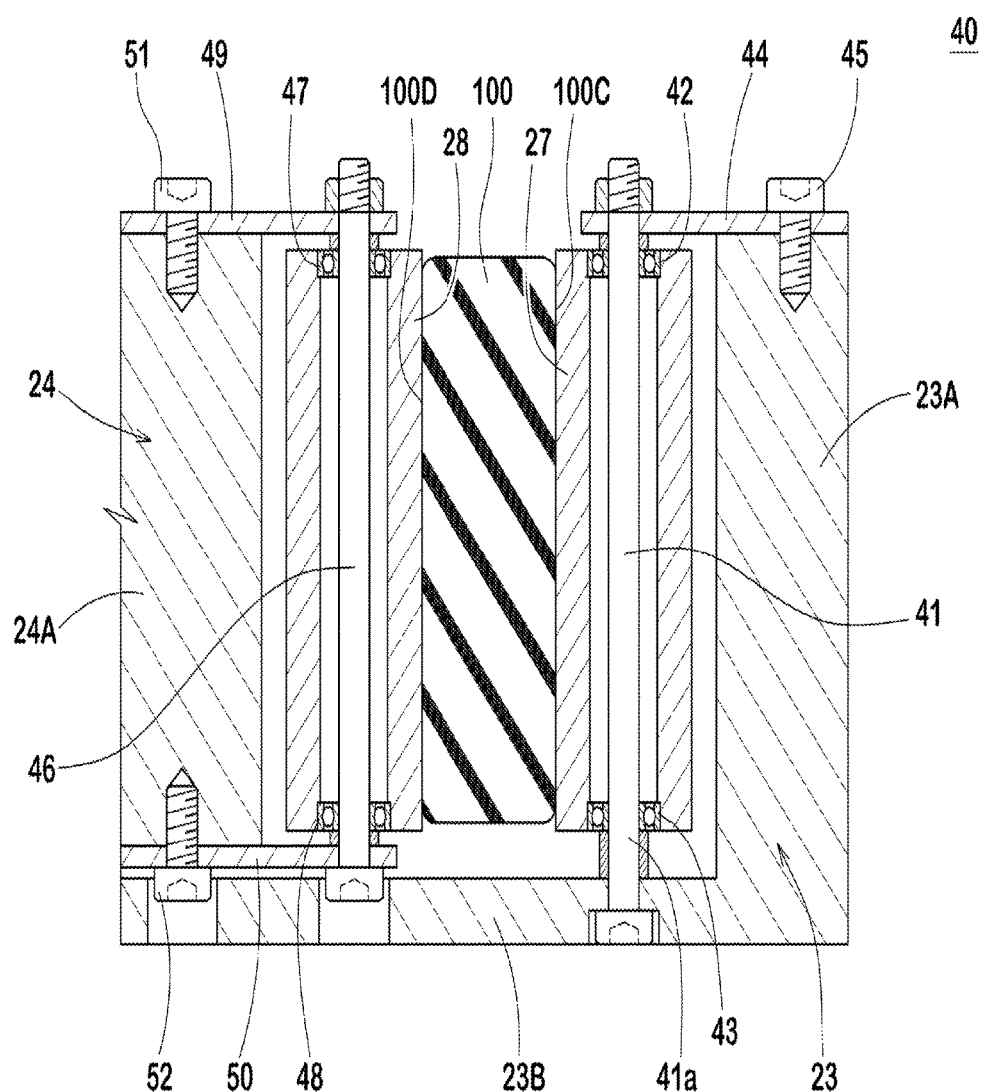
FIG. 11 is a sectional view illustrating a supporting structure of outer rollers and inner rollers of FIG. 7.

FIG. 11 illustrates a supporting structure 40 of the outer roller 27 and the inner roller 28.

The outer roller 27, for example, is rotatably supported while using a supporting axis 41, bearings 42 and 43, and a supporting plate 44 and the like. One end of the supporting axis 41 is supported by the side edge plate 23B of the outer supporting portion 23, and the other end thereof is supported by the supporting plate 44. The supporting axis 41 rotatably supports the outer roller 27 through the bearings 42 and 43.

The bearings 42 and 43 are disposed on both ends of the outer roller 27. In this embodiment, the configuration that the outer roller 27 rotates around the fixed supporting axis 41 is disclosed. Alternatively, the configuration that the outer roller 27 rotates together with the supporting axis 41 by providing the bearings 42 and 43 on the side edge plate 23B and the supporting plate 44 respectively may be employed.

The supporting plate 44 is fixed to the end surface of the outer ring 23A of the outer supporting portion 23 using a bolt 45 and the like, for example. As illustrated in FIG. 7, although the supporting plate 44 of the embodiment is formed continuously in the circumferential direction of the outer ring 23A, it may be divided into a plurality of pieces.

According to the supporting structure 40 illustrated in FIG. 11, the outer roller 27 can rotate smoothly while restraining the ground contact surface 100C of the tread ring 100. Thus, friction in the circumferential direction between the ground contact surface 100C of the non-measurement region 100B and the outer supporting portion 23 can be reduced.

The inner roller 28, for example, is also rotatably supported while using a supporting axis 46, bearings 47 and 48, and supporting plates 49 and 50 and the like, similar to the outer roller 27. One end of the supporting axis 46 is supported by the supporting plate 49, and the other end thereof is supported by the supporting plate 50. In this embodiment, the configuration that the inner roller 28 rotates around the fixed supporting axis 46 is disclosed. Alternatively, the configuration that the inner roller 28 rotates together with the supporting axis 46 by providing the bearings 47 and 48 on the supporting plates 49 and 50 respectively may be employed.

The supporting plates 49 and 50 are fixed to both end surfaces of the inner ring 24A of the inner supporting portion 24 using blots 51 and 52, for example. As illustrated in FIG. 7, although the supporting plates 49 and 50 are formed continuously in the circumferential direction of the inner ring 24A, it may be divided into a plurality of pieces.

According to the supporting structure 40 illustrated in FIG. 11, the inner roller 28 can rotate smoothly while restraining the inner surface 100D of the tread ring 100. Thus, friction in the circumferential direction between the inner surface 100D of the non-measurement region 100B and the inner supporting portion 24 can be reduced.

Figure 12:
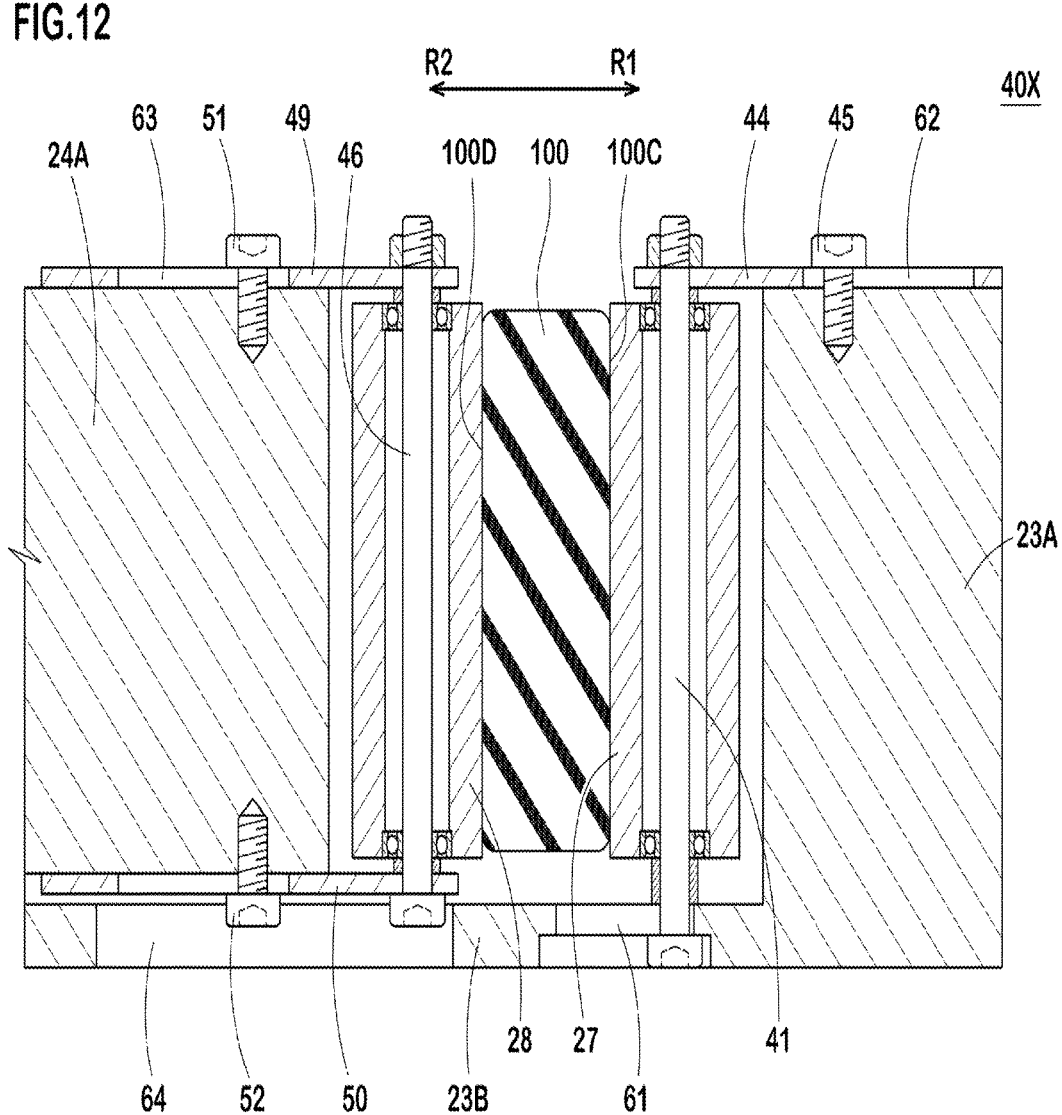
FIG. 12 is a sectional view illustrating a modified example of the support structure of FIG. 11.

FIG. 12 illustrates the supporting structure 40X which is a modified example of the supporting structure 40. In the supporting structure 40X, the outer roller 27 and the inner roller 28 are configured to move in the radial direction R1 or R2 of the tread ring 100. This feature is different from the supporting structure 40 illustrated in FIG. 11.

In the supporting structure 40X, the supporting plate 44 is divided into a plurality of pieces in the circumferential direction of the outer ring 23A. Similarly, the supporting plates 49 and 50 are divided into a plurality of pieces in the circumferential direction of the inner ring 24A. In the supporting structure 40X, by moving the positions of the supporting axis 41 and the supporting plate 44 relative to the outer ring 23A and the side edge plate 23B respectively in the radial direction R1 or R2, the outer roller 27 can move. In order to move the outer roller 27, the side edge plate 23B is provided with a slot 61 extending in the radial direction long R1 and R2, for example. similarly, the supporting plate 44 is provided with a slot 62 extending in the radial direction R1 and R2. By moving the supporting plate 44 together with the supporting axis 41 along the slot 61 and the slot 62, the outer roller 27 can move in the radial direction R1 or R2 of the tread ring 100.

Similarly, in the supporting structure 40X, the inner roller 28 can move by shifting the positions of the supporting plates 49 and 50 relative to the inner ring 24A in the radial direction R1 or R2 of the tread ring 100. In order to move the inner roller 28, the supporting plate 49 is provided with a slot 63 extending in the radial direction R1 and R2 through which the blot 51 is inserted, for example. The inner roller 28 can be moved in the radial direction R1 or R2 of the tread ring 100 by moving the supporting plates 49 and 50 along the slot 63 and the slot 64 respectively with loosening the blots 51 and 52.

As the structure where the outer roller 27 is movably supported in the radial direction R1 or R2 of the tread ring 100 other than the above supporting structure 40X, the hole to which the supporting axis 41 is to be inserted may be formed on the supporting plate 44 in a slot shape extending in the radial direction R1 and R2. Similarly, the hole to which the supporting axis 46 may be formed on the respective supporting plates 49 and 50 in a slot shape.

In the supporting structure 40X, since the outer roller 27 and the inner roller 28 are configured to move in the radial direction R1 or R2 of the tread ring 100, the respective contact pressure of the outer roller 27 and the inner roller 28 against the tread ring 100 can be adjusted exactly. Thus, it is possible to adjust balance between the degree of deformation of the non-measurement region 100B of the tread ring 100 and the friction among the outer roller 27, the inner roller 28 and the tread ring 100. Furthermore, tread ring 100 with different size may be installed into the support jig 2A by setting a moving range of the outer roller 27 and the inner roller 28 properly, and therefore the non-measurement region 100B thereof is substantially restrained through the outer roller 27 and the inner roller 28 in a non-deformable manner. Accordingly, rigidity of the tread ring 100 with different size can be measured without exchanging the outer supporting portion 23 and the inner supporting portion 24, thereby improving working efficiency.

In the supporting structure 40 and the supporting structure 40X, an elastic member such as a spring may be employed so that the outer roller 27 is energized radially inward of the tread ring 100 and the inner roller 28 is energized radially outward of the tread ring 100.

FIGS. 13A to 13B illustrate a uniformity measurement method of the tread ring 100 of an airless tire using the rigidity measurement device 1. The uniformity measurement method of the tread ring 100 includes a holding step for holding the tread ring 100 and measuring step for measuring a deformed state of the tread ring 100.

As illustrated in FIG. 13A, in the holding step, the tread ring 100 is held by the support jig 2. That is to say, the tread ring 100 is held so that the non-measurement region 100B except the measurement region 100A is restrained by the restraint portion 22 of the support jig 2A. At that time, the measurement region 100A that is a part in the circumferential direction is exposed from the opening 21 of the support jig 2A in a deformable manner.

As illustrated in FIG. 13B, in the measuring step, the support jig 2A is driven by the driving unit 4 to move toward the flat plate 3, i.e. in the direction of the arrow A1, in order to apply a load to the measurement region 100A of the tread ring 100. At that time, since the non-measurement region 100B is kept in a non-deformable manner by the restraint portion 22 of the support jig 2A, only the measurement region 100A deforms and generate stress. In the measuring step, the displacement of the support jig 2A and the force acted on the flat plate 3 are measured as for a deformation state of the tread ring 100.

Then, as illustrated in FIG. 13C, the support jig 2A is driven in a travel direction of the tread ring 100, i.e. in the direction of the arrow D. As a result, the tread ring 100 rotates in the direction of the arrow C so that the measurement region 100A moves in different position in the circumferential direction of the tread ring 100. At that time, the outer rollers 27 and the inner rollers 28 which support the tread ring 100 rotate in directions of the arrows B1 and B2 respectively to reduce friction between the non-measurement region 100B of the tread ring 100 and the restraint portion 22. Thus, it is possible to rotate the tread ring 100 without removing the inner supporting portion 24 from the outer supporting portion 23. As described above, since a deformed state of the tread ring 100 over the entire length is measured continuously by moving the support jig 2A in the direction of the arrow D until the tread ring 100 rotates at least once, it is possible to measure the uniformity of the tread ring alone efficiently.

In this embodiment, although a deformed state of the tread ring 100 over the entire length is measured by moving the support jig 2A with respect to the fixed flat plate 3, it may alternatively be configured that the flat plate 3 moves with respect to the fixed support jig 2A. In another embodiment, when a drum is used instead of the flat plate 3, a deformed state of the tread ring 100 over the entire length may be measured while rotating the drum.

While the measurement device of a tread ring and the uniformity measurement method of a tread ring of the present invention have been described in detail, the present invention is not limited to the embodiments as illustrated, but it may be carried out by modifying to various aspects.

Example

The rigidity measurement device of a tread ring with the support jig having a basic structure illustrated in FIG. 2 was manufactured, and then vertical rigidity of the tread ring alone was measured. As for a comparative example, the vertical rigidity of the tread ring alone was measured without using the support jig. Upon measuring the vertical rigidity, the loads corresponding to 50%, 100% and 120% of the load index of a pneumatic tire which is equivalent to the airless tire to be measured in view of specifications, e.g. an outer diameter, a width and the like, were applied.

Evaluation of the rigidity measurement propriety "S" means that the vertical rigidity was able to measure in the condition where only the measurement region deforms. Evaluation of the rigidity measurement propriety "A" means that the vertical rigidity measured is believed to depend almost on the rigidity of the measurement region in spite of a part of the non-measurement region slightly deforming. Evaluation of the rigidity measurement propriety "B" means that the vertical rigidity was measured in the condition where only the measurement region deforms, but attaching and detaching work of the tread ring was difficult. Evaluation of the rigidity measurement propriety "C" means that the vertical rigidity was not able to be measured by the applied load due to less deformation of the tread ring. Evaluation of the rigidity measurement propriety "D" means that the measured vertical rigidity significantly depends on the rigidity of the non-measurement region since almost entire region of the tread ring deformed.

TABLE 1

|  | Ref. | Ex. 1 | Ex. 2 | Ex. 3 | Ex. 4 |
|---|---|---|---|---|---|
| Support jig | None | Presence | Presence | Presence | Presence |
| Outer supporting portion | None | Presence | Presence | Presence | Presence |
| Inner supporting portion | None | Presence | None | Presence | Presence |
| CL (mm) | — | 60 | 60 | 20 | 30 |
| Ji/Ro | — | 1 | 1 | 1 | 1 |
| Jo/Ri | — | 1 | 1 | 1 | 1 |
| Stiffness 50% load | D | S | S | S | S |
| measurement 100% load | D | S | S | C | S |
| propriety 120% load | D | S | A | C | C |

|  | Ex. 5 | Ex. 6 | Ex. 7 | Ex. 8 | Ex. 9 |
|---|---|---|---|---|---|
| Support jig | Presence | Presence | Presence | Presence | Presence |
| Outer supporting portion | Presence | Presence | Presence | Presence | Presence |
| Inner supporting portion | Presence | Presence | Presence | Presence | Presence |
| CL (mm) | 300 | 400 | 60 | 60 | 60 |
| Ji/Ro | 1 | 1 | 0.99 | 0.995 | 1.02 |
| Jo/Ri | 1 | 1 | 1 | 1 | 1 |
| Stiffness 50% load | S | S | B | S | S |
| measurement 100% load | S | A | B | S | S |
| propriety 120% load | A | A | B | S | S |

|  | Ex. 10 | Ex. 11 | Ex. 12 | Ex. 13 | Ex. 14 |
|---|---|---|---|---|---|
| Support jig | Presence | Presence | Presence | Presence | Presence |
| Outer supporting portion | Presence | Presence | Presence | Presence | Presence |
| Inner supporting portion | Presence | Presence | Presence | Presence | Presence |
| CL (mm) | 60 | 60 | 60 | 60 | 60 |
| Ji/Ro | 1.04 | 1 | 1 | 1 | 1 |
| Jo/Ri | 1 | 0.98 | 0.99 | 1.03 | 1.05 |
| Stiffness 50% load | S | S | S | S | B |
| measurement 100% load | A | A | S | S | B |
| propriety 120% load | A | A | S | S | B |

As clearly shown in Table 1, it is confirmed that the device for measuring rigidity of the tread ring according to the embodiment can measure the rigidity of the measurement region correctly as compared with the comparative example.

The rigidity measurement device of a tread ring with the support jig having a basic structure illustrated in FIG. 6 was manufactured, and then vertical rigidity of the tread ring alone was measured. As for comparative example 1, the vertical rigidity of the tread ring alone was measured without using the support jig. As for comparative example 2, the vertical rigidity of the tread ring alone was measured using the support jig without having the friction reducing means. Upon measuring the vertical rigidity, the loads corresponding to 50%, 100% and 120% of the load index of a pneumatic tire which is equivalent to the airless tire to be measured in view of specifications, e.g. an outer diameter, a width and the like, were applied.

Evaluation of the rigidity measurement propriety "S" means that the vertical rigidity was measured properly and continuously in the condition where only the measurement region deforms with a smooth rotation of the tread ring. Evaluation of the rigidity measurement propriety "A" means that the tread ring rotated easily and the vertical rigidity measured is believed to depend almost on the rigidity of the measurement region in spite of a part of the non-measurement region slightly deforming. Evaluation of the rigidity measurement propriety "B" means that the vertical rigidity was not able to be measured by the applied load due to less deformation of the tread ring although the tread ring smoothly rotated. Evaluation of the rigidity measurement propriety "C" means that the vertical rigidity was measured properly in spite of some difficulty in rotation of the tread ring. Evaluation of the rigidity measurement propriety "D" means that the vertical rigidity was not able to be measured continuously since the tread ring failed to rotate. Evaluation of the rigidity measurement propriety "E" means that the measured vertical rigidity significantly depends on the rigidity of the non-measurement region since almost entire region of the tread ring deformed.

TABLE 2

|  | Ref. 1 | Ref. 2 | Ex. 1 | Ex. 2 | Ex. 3 |
|---|---|---|---|---|---|
| Support jig | None | Presence | Presence | Presence | Presence |
| Friction reducing means | None | None | Presence | Presence | Presence |
| Outer supporting portion | None | None | Presence | Presence | Presence |
| Inner supporting portion | None | None | Presence | None | Presence |
| CL (mm) | — | 60 | 60 | 60 | 20 |
| Ji'/Ro | — | 1 | 1 | 1 | 1 |
| Outer roller movement | — | — | No | No | No |
| Inner roller movement | — | — | No | No | No |
| Jo'/Ri | — | 1 | 1 | 1 | 1 |
| Stiffness 50% load | E | D | S | S | S |
| measurement 100% load | E | D | S | S | B |
| propriety 120% load | E | D | S | A | B |

|  | Ex. 4 | Ex. 5 | Ex. 6 | Ex. 7 | Ex. 8 |
|---|---|---|---|---|---|
| Support jig | Presence | Presence | Presence | Presence | Presence |
| Friction reducing means | Presence | Presence | Presence | Presence | Presence |
| Outer supporting portion | Presence | Presence | Presence | Presence | Presence |
| Inner supporting portion | Presence | Presence | Presence | Presence | Presence |
| CL (mm) | 30 | 300 | 400 | 60 | 60 |
| Ji'/Ro | 1 | 1 | 1 | 0.99 | 0.995 |
| Outer roller movement | No | No | No | No | No |
| Inner roller movement | No | No | No | No | No |
| Jo'/Ri | 1 | 1 | 1 | 1 | 1 |
| Stiffness 50% load | S | S | S | C | S |
| measurement 100% load | S | S | A | C | S |
| propriety 120% load | B | A | A | C | S |

|  | Ex. 9 | Ex. 10 | Ex. 11 | Ex. 12 | Ex. 13 |
|---|---|---|---|---|---|
| Support jig | Presence | Presence | Presence | Presence | Presence |
| Friction reducing means | Presence | Presence | Presence | Presence | Presence |
| Outer supporting portion | Presence | Presence | Presence | Presence | Presence |
| Inner supporting portion | Presence | Presence | Presence | Presence | Presence |
| CL (mm) | 60 | 60 | 60 | 60 | 60 |
| Ji'/Ro | 1.02 | 1.04 | 1 | 1 | 1 |
| Outer roller movement | No | No | No | No | No |
| Inner roller movement | No | No | No | No | No |
| Jo'/Ri | 1 | 1 | 0.98 | 0.99 | 1.03 |
| Stiffness 50% load | S | S | S | S | S |
| measurement 100% load | S | A | A | S | S |
| propriety 120% load | S | A | A | S | S |

|  | Ex. 14 | Ex. 15 | Ex. 16 |
|---|---|---|---|
| Support jig | Presence | Presence | Presence |
| Friction reducing means | Presence | Presence | Presence |
| Outer supporting portion | Presence | Presence | Presence |
| Inner supporting portion | Presence | Presence | Presence |
| CL (mm) | 60 | 60 | 60 |
| Ji'/Ro | 1.05 | 1 | 1 |
| Outer roller movement | No | Yes | Yes |
| Inner roller movement | No | Yes | Yes |
| Jo'/Ri | 1 | 1 | 1 |
| Stiffness 50% load | C | S | S |
| measurement 100% load | C | S | S |
| propriety 120% load | C | S | S |

As clearly shown in Table 2, it is confirmed that the device for measuring rigidity of the tread ring according to the embodiment can measure the rigidity of the measurement region correctly and continuously as compared with the comparative example.

REFERENCE SIGNS LIST

1 Rigidity measurement device
2 Support jig
2A Support jig
3 Flat plate

21 Opening
22 Restraint portion
23 Outer supporting portion
23A Outer ring
24 Inner supporting portion
24A Inner ring
100 Tread ring
100A Measurement region
100B Non-measurement region

The invention claimed is:

1. A rigidity measurement device for measuring rigidity of a tread ring in a circumferential direction of the tread ring, comprising:
a support jig having an opening and a restraint portion such that the support jig supports a tread ring, the opening exposes a measurement region of a tread ring outwardly in a deformable manner, and the restraint portion restrains a non-measurement region of the tread ring in a non-deformable manner,
wherein the tread ring has a cylindrical shape having a ground contact surface and is formed for an airless tire such that the airless tire comprises the tread ring, a hub disposed radially inward of the tread ring and configured to be fixed to an axle, and a spoke structure connecting the tread ring and the hub.

2. The rigidity measurement device according to claim 1, wherein the support jig is configured to hold the tread ring detachably.

3. The rigidity measurement device according to claim 1, wherein the restraint portion comprises an outer supporting portion configured to contact with the ground contact surface of the tread ring in the non-measurement region to restrain the tread ring.

4. The rigidity measurement device according to claim 3, wherein the outer supporting portion comprises an outer ring configured to contact with the ground contact surface of the tread ring in the non-measurement region continuously.

5. The rigidity measurement device according to claim 3, wherein the support jig has a ratio Ji/Ro in a range of from 0.995 to 1.02, where Ji represents an inner diameter of the outer supporting portion and Ro represents an outer diameter of the ground contact surface of the tread ring.

6. The rigidity measurement device according to claim 1, wherein the restraint portion comprises an inner supporting portion configured to contact with a radially inner surface of the tread ring in the non-measurement region to restrain the tread ring.

7. The rigidity measurement device according to claim 6, wherein the inner supporting portion comprises an inner portion having a column shape configured to contact with the inner surface of the tread ring in the non-measurement region continuously.

8. The rigidity measurement device according to claim 6, wherein the support jig has a ratio Jo/Ri in a range of from 0.99 to 1.03, where Jo represents an outer diameter of the inner supporting portion and Ri represents an inner diameter of the inner surface of the tread ring.

9. The rigidity measurement device according to claim 1, wherein the support jig is configured to support the tread ring rotatably in the circumferential direction.

10. The rigidity measurement device according to claim 9, wherein the restraint portion comprises a friction reducing device configured to contact with the non-measurement region such that friction to the non-measurement region is reduced.

11. The rigidity measurement device according to claim 10, wherein the restraint portion comprises an outer supporting portion configured to contact with the ground contact surface of the tread ring in the non-measurement region to restrain the tread ring, and the friction reducing device is positioned on the outer supporting portion.

12. The rigidity measurement device according to claim 11, wherein the friction reducing device comprises a plurality of rotatably supported outer rollers each having an outer surface configured to contact with the ground contact surface of the tread ring.

13. The rigidity measurement device of a tread ring according to claim 12, wherein the support jig has a ratio Ji'/Ro in a range of from 0.995 to 1.02, where Ji' represents a diameter of an arc formed by connecting outer contact points of each outer surface of each outer roller which come into contact with the ground contact surface and Ro represents an outer diameter of the ground contact surface of the tread ring.

14. The rigidity measurement device according to claim 12, wherein the outer rollers are configured to move in a radial direction of the tread ring.

15. The rigidity measurement device according to claim 10, wherein the restraint portion comprises an inner supporting portion configured to contact with a radially inner surface of the tread ring in the non-measurement region to restrain the tread ring, and the friction reducing device is positioned on the inner supporting portion.

16. The rigidity measurement device according to claim 15, wherein the friction reducing device comprises a plurality of rotatably supported inner rollers each having an outer surface configured to contact with the ground contact surface of the tread ring.

17. The rigidity measurement device of a tread ring according to claim 16, wherein the support jig has a ratio Jo'/Ri in a range of from 0.99 to 1.03, where Jo' represents a diameter of an arc formed by connecting inner contact points of each outer surface of each inner roller which come into contact with the inner surface and Ri represents an inner diameter of the inner surface of the tread ring.

18. The rigidity measurement device according to claim 16, wherein the inner rollers are configured to move in a radial direction of the tread ring.

19. The rigidity measurement device according to claim 1, wherein the opening of the support jig has a chord length in a range of from 30 mm to 300 mm.

20. A method for measuring a circumferential uniformity of rigidity of a tread ring, comprising:
holding a tread ring such that a measurement region of the tread ring in a circumferential direction is kept in a deformable manner while restraining a non-measurement region of the tread ring; and
measuring a deformed state of the tread ring upon applying load on the measurement region;
wherein the holding and the measuring are conducted in a different position in the circumferential direction of the tread ring by moving to another measurement region of the tread ring, and the tread ring has a cylindrical shape having a ground contact surface and is formed for an airless tire such that the airless tire comprises the tread ring, a hub disposed radially inward of the tread ring and configured to be fixed to an axle, and a spoke structure connecting the tread ring and the hub.

21. A method for measuring a circumferential uniformity of rigidity of a tread ring, comprising:
holding a tread ring such that a measurement region of the tread ring in a circumferential direction is in a deformable manner while restraining a non-measurement region of the tread ring; and measuring a deformed state of the tread ring upon applying load on the measurement region while shifting the tread ring in the circumferential direction such that the deformed state of the tread ring is continuously measured while moving the measurement region in different positions in the circumferential direction of the tread ring, wherein the tread ring has a cylindrical shape having a ground contact surface and is formed for an airless tire such that the airless tire comprises the tread ring, a hub disposed radially inward of the tread ring and configured to be fixed to an axle, and a spoke structure connecting the tread ring and the hub.

* * * * *